United States Patent
Hu

(10) Patent No.: US 10,007,842 B2
(45) Date of Patent: Jun. 26, 2018

(54) SAME PERSON DETERMINATION DEVICE AND METHOD, AND CONTROL PROGRAM THEREFOR

(71) Applicant: FUJIFILM Corporation, Tokyo (JP)

(72) Inventor: Xuebin Hu, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

(21) Appl. No.: 15/290,087

(22) Filed: Oct. 11, 2016

(65) Prior Publication Data

US 2017/0032181 A1 Feb. 2, 2017

Related U.S. Application Data

(63) Continuation of application No. PCT/JP2015/061426, filed on Apr. 14, 2015.

(30) Foreign Application Priority Data

May 29, 2014 (JP) .................................. 2014-110916

(51) Int. Cl.
*G06K 9/00* (2006.01)
(52) U.S. Cl.
CPC ..... *G06K 9/00288* (2013.01); *G06K 9/00228* (2013.01); *G06K 9/00268* (2013.01); *G06K 9/00295* (2013.01); *G06K 9/00677* (2013.01)
(58) Field of Classification Search
CPC ........... G06K 9/00288; G06K 9/00228; G06K 9/00268; G06K 9/00295; G06K 9/00677
See application file for complete search history.

(56) References Cited

U.S. PATENT DOCUMENTS

| 8,379,939 B1 | 2/2013 | Bourdev et al. |
| 2006/0239515 A1 | 10/2006 | Zhang et al. |

(Continued)

FOREIGN PATENT DOCUMENTS

| EP | 2 688 039 A1 | 1/2014 |
| JP | 2006-343791 A | 12/2006 |

(Continued)

OTHER PUBLICATIONS

Baoyuan Wu et al.; "Constrained Clustering and Its Application to Face Clustering in Videos"; IEEE Computer Society Conference on Computer Vision and Pattern Recognition; Jun. 23, 2013; pp. 3507-3514; IEEE Computer Society; US; XP032493140; ISSN: 1063-6919.

Ramazan Gokberk Cinbis et al.; "Unsupervised Metric Learning for Face Identification in TV Video"; 2011 IEEE International Conference on Computer Vision; Nov. 6, 2011; pp. 1559-1566; IEEE; XP032101368; ISBN: 978-1-4577-1101-5.

Tong Zhang et al.; "Face Based Image Navigation and Search"; Proceedings of the 17th ACM International conference on Multimedia; Jan. 1, 2009; pp. 597-600; Beijing, China; XP055307518; ISBN 978-1-60558-608-3.

(Continued)

*Primary Examiner* — David F Dunphy
(74) *Attorney, Agent, or Firm* — Studebaker & Brackett PC

(57) ABSTRACT

A same person determination device, a same person determination method, and a control program of a computer of the same person determination device capable of determining whether persons are the same persons even when there are similar faces are provided. It is determined whether there are a plurality of approximation and non-approximation relationships in which a feature amount of one face of one image approximates to a feature amount of one face of the other image (YES in step 28), and the feature amount of the one face of the one image does not approximate to feature amounts of all other faces other than the one face of the other image (YES in step 29) (step 31). In a case where there are the plurality of approximation and non-approximation relationships, the one face of one image and the one face of the other image are determined to be of the same person.

9 Claims, 10 Drawing Sheets

(56) References Cited

U.S. PATENT DOCUMENTS

| | | | |
|---|---|---|---|
| 2010/0226584 A1* | 9/2010 | Weng | G06K 9/00221 |
| | | | 382/225 |
| 2010/0266166 A1 | 10/2010 | Kawahara et al. | |
| 2012/0106806 A1 | 5/2012 | Folta et al. | |
| 2014/0010458 A1 | 1/2014 | Nakamura et al. | |

FOREIGN PATENT DOCUMENTS

| | | |
|---|---|---|
| JP | 2007-102549 A | 4/2007 |
| JP | 2009-059042 A | 3/2009 |
| JP | 2010-211785 A | 9/2010 |
| JP | 2011-034133 A | 2/2011 |
| JP | 2012-064082 A | 3/2012 |

OTHER PUBLICATIONS

The extended European search report issued by the European Patent Office on May 19, 2017, which corresponds to European Patent Application No. 15798876.7-1901 and is related to U.S. Appl. No. 15/290,087.

International Search Report issued in PCT/JP2015/061426; dated Jun. 30, 2015.

An Office Action issued by the European Patent Office dated Jan. 31, 2018, which corresponds to EP15798876.7-1207 and is related to U.S. Appl. No. 15/290,087.

J. Foytik, P. Sankaran and V. Asari, "Tracking and Recognizing Multiple Faces Using Kalman Filter and ModularPCA," Procedia Computer Science 6, 2011, pp. 256-261.

\* cited by examiner

FIG. 13

FEATURE AMOUNT TABLE

| IMAGE | FACE | FEATURE AMOUNT OF FACE |
|---|---|---|
| IMAGE 1 | F11 | L11 |
| | F12 | L12 |
| | F13 | L13 |
| | F14 | L14 |
| IMAGE 2 | F21 | L21 |
| | F22 | L22 |
| | F23 | L23 |
| IMAGE 3 | F31 | L31 |
| | F32 | L32 |
| IMAGE 4 | F41 | L41 |
| | F42 | L42 |
| | F43 | L43 |

FIG. 14

SAME PERSON TABLE

| GROUP | SAME PERSON |
|---|---|
| GROUP 1 (MOTHER) | H11, H21, H42 |
| GROUP 2 (ELDEST SON) | H12, H43 |
| GROUP 3 (SECOND SON) | |
| GROUP 4 (FATHER) | H14, H22 |

FIG. 15

NON-SAME PERSON TABLE

| PERSON | NON-SAME PERSON |
|--------|-----------------|
| H11 | H22, H23, H42, H43 |
| H14 | H21, H23 |
| H21 | H12, H13, H14, H42, H43 |
| H22 | H11, H12, H13 |
| H41 | H12, H13, H14, H22, H23 |
| H43 | H11, H13, H14 |

SAME PERSON DETERMINATION DEVICE AND METHOD, AND CONTROL PROGRAM THEREFOR

CROSS-REFERENCE TO RELATED APPLICATIONS

This application is a Continuation of PCT International Application No. PCT JP2015/061426 filed on Apr. 14, 2015, which claims priority under 35 U.S.C. § 119(a) to Japanese Patent Application No. 2014-110916 filed May 29, 2014. Each of the above application(s) is hereby expressly incorporated by reference, in its entirety, into the present application.

BACKGROUND OF THE INVENTION

1. Field of the Invention

The present invention relates to a same person determination device and method, and a control program therefor.

2. Description of the Related Art

With the propagation of digital cameras and smartphones, imaging has become easy, and very many images may be stored in a memory card or a personal computer. For example, in a case where an album is created from a number of images, it is necessary for persons to be grouped in order to find a main person. Therefore, there are identification of a plurality of faces (U.S. Pat. No. 8,379,939B), formation of a group of the same persons (JP2006-343791A, JP2007-102549A, JP2010-211785A, and JP2012-64082A), person collation (JP2011-34133A), estimation of human relationships (JP2009-59042A), and the like.

SUMMARY OF THE INVENTION

In a case where main persons are classified from a plurality of images in which a plurality of person images are included, it is common to identify and classify the persons using face detection and authentication technology, but there may be disadvantageous situations in classification of persons due to the presence of others (faces of others) other than the main person, directions of various faces, facial expressions, lighting conditions, or the like in a plurality of images. Therefore, highly accurate identification of the main person is not always easy. In a case where a person is automatically extracted, pre-registration of the main person cannot be performed.

In U.S. Pat. No. 8,379,939B, a distance as a measure of a degree of similarity between faces is calculated in order to identify a plurality of faces from a plurality of images, and a face is identified on the basis of the distance, but in a case where faces are similar as in a parent and a child, brothers, or relatives, or the like, the distances may be short, and accordingly, the faces may not be distinguished. In JP2006-343791A, since an area corresponding to a face area detected from temporally different frames is found and a group of same persons is formed, a moving image is necessary. In JP2007-102549A, respective feature amounts of faces are sorted and it is difficult to distinguish similar faces from each other. In JP2010-211785A, a plurality of face areas are grouped according to a similarity, but it is difficult to distinguish similar faces from each other. In JP2012-64082A, a feature amount of a face for each facial expression is stored and compared with a detected feature amount of a face so as to identify a person, but it is difficult to distinguish similar faces from each other. In JP2011-34133A, IDs of a brother and a relative are added as tag information, and a degree of similarity of images of the brother, the relative, and the like is obtained and collated, but pre-registration in a database is necessary for that. In JP2009-59042A, who a person is estimated using persons that have been imaged together, but accuracy is not high.

An object of the present invention is to enable determination as to whether there are the same persons among similar faces of a parent, a brother, or a relative.

A same person determination device according to the invention comprises a first feature amount calculation device (first feature amount calculation means) for calculating a feature amount of each of a plurality of faces from one image in which the plurality of faces are included; a feature amount comparison device (feature amount comparison means) for comparing the feature amount of each face calculated from the one image by the first feature amount calculation device with a feature amount of each of a plurality of faces included in another image different from the one image; and a person determination device (person determination means) for determining that one face included in the one image and one face included in the other image are a face of the same person when a plurality of relationships in which a feature amount of the one face calculated from the one image approximates to a feature amount of one face obtained from the other image, and the feature amount of the one face calculated from the one image does not approximate to feature amounts of all other faces other than the one face obtained from the other image are obtained from the one image and the other image through the comparison in the feature amount comparison device.

The present invention also provides a same person determination method. That is, this method comprises calculating, by a feature amount calculation device (feature amount calculation means), a feature amount of each of a plurality of faces from one image in which the plurality of faces are included; comparing, by a feature amount comparison device (feature amount comparison means), the feature amount of each face calculated from the one image by the first feature amount calculation device with a feature amount of each of a plurality of faces included in another image different from the one image; and determining, by a person determination device (person determination means), that one face included in the one image and one face included in the other image are a face of the same person when a plurality of relationships in which a feature amount of the one face calculated from the one image approximates to a feature amount of one face obtained from the other image, and the feature amount of the one face calculated from the one image does not approximate to feature amounts of all other faces other than the one face obtained from the other image are obtained from the one image and the other image through the comparison in the feature amount comparison device.

This invention also provides a non-transitory recording medium storing a computer-readable program for controlling a computer of a same person determination device. Such a program may be provided.

The person determination device may determine that the one face included in the one image and the one face included in the other image are a face of the same person and determine that the one face included in the one image and all other faces included in the other image are of non-same persons, for example, when the plurality of relationships are obtained from the one image and the other image.

In a case where only one of the relationships is obtained from the one image and the other image, the person determination device may not determine that the one face included in the one image and the one face included in the other image are a face of the same person.

The same person determination device may further comprise a second feature amount calculation device (second feature amount calculation means) for calculating a feature amount of each of the plurality of faces from the other image. In this case, the feature amount comparison device may compare the feature amount of each face calculated from the one image by the first feature amount calculation device with the feature amount of each face calculated from the other image by the second feature amount calculation device.

The same person determination device may further include a feature amount storage device (feature amount storage means) for storing the feature amount of each of the plurality of faces included in the other image. In this case, the feature amount comparison device may compare the feature amount of each face calculated from the one image by the first feature amount calculation device with the feature amount of each face stored in the feature amount storage device.

In a case where there are a plurality of other images, the same person determination device may further comprise: a control device (control means) for performing a process in the feature amount comparison device and a process in the person determination device on the plurality of other images.

The same person determination device further comprises a grouping device (grouping means) for grouping respective faces determined to be faces of the same person by the person determination device.

According to the present invention, the feature amount of each of a plurality of faces is calculated from one image in which a plurality of faces are included. The calculated feature amount of each face is compared with the feature amount of each of the plurality of faces included in another image different from the one image (the feature amounts of the plurality of faces included in the other image may be calculated in advance or may be calculated at the time of the comparison). It is determined that the one face included in the one image and the one face included in the other image are a face of the same person in a case where a plurality of relationships in which the feature amount of the one face calculated from the one image approximates to the feature amount of the one face calculated from the other image (for example, if a difference between the feature amount of the one face calculated from the one image and the feature amount of the one face calculated from the other image is smaller than a threshold value, it is determined that the feature amounts approximate to each other), and the feature amount of the one face calculated from the one image does not approximate to the feature amounts of all other faces other than the one face calculated from the other image (for example, if a difference between the feature amount of the one face calculated from the one image and the feature amounts of all other faces other than the face at a position calculated from the other image exceeds the threshold value, it is determined that the feature amounts do not approximate to each other) are obtained from the one image and the other image.

According to the present invention, it is determined that the one face included in the one image and the one face included in the other image are a face of the same person in a case where a plurality of relationships in which the feature amount of the one face calculated from the one image approximates to the feature amount of the one face calculated from the other image, and the feature amount of the one face calculated from the one image does not approximate to the feature amounts of all other faces other than the one face calculated from the other image are obtained from the one image and the other image. The persons of the faces are determined to be the same person in consideration of the fact that feature amounts of the faces do not approximate to each other, rather than the persons of the faces being determined to be the same person since the feature amounts of the faces merely approximate to each other. Accordingly, it is possible to determine whether persons are the same persons even when there are similar faces. Further, since it is determined that the one face included in the one image and the one face included in the other image are a face of the same person in a case where a plurality of relationships in which the feature amount of the one face calculated from the one image does not approximate to the feature amounts of all other faces other than the one face calculated from the other image, rather than only one relationship, are obtained, it is possible to determine whether persons are the same persons even when there are more similar faces of a parent and a child, a brother, a relative, or the like. It is necessary to increase a threshold value of a degree of similarity of a face for determining whether persons are the same person in order to increase accuracy of a determination of the same person, but if the threshold value increases, it may be determined that the persons are not the same person even when the persons are the same person. According to the present invention, since it is determined that that the persons are the same person in a case where a plurality of relationships described above are obtained, it is possible to limit the threshold value of the degree of similarity of a face for determining whether persons are the same person. A determination of more same persons can be performed.

BRIEF DESCRIPTION OF THE DRAWINGS

FIG. 13 is an example of a feature amount table.

FIG. 14 is an example of the same person table.

FIG. 15 is an example of a non-same person table.

DESCRIPTION OF THE PREFERRED EMBODIMENTS

Figure 1:
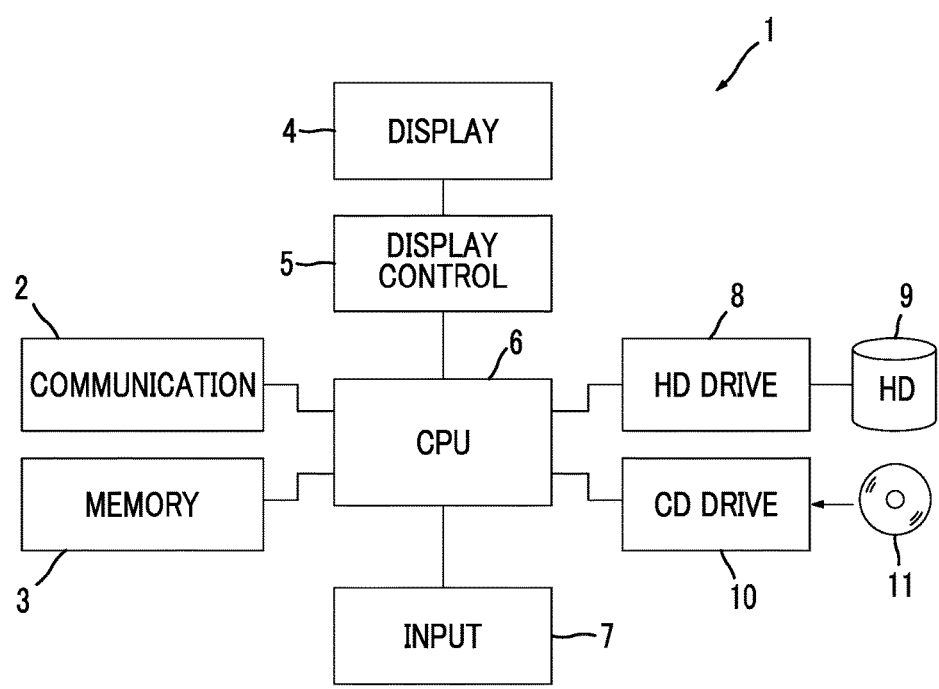
FIG. 1 is a block diagram illustrating an electrical configuration of a same person determination device.

FIG. 1 illustrates an embodiment of the present invention, and is a block diagram illustrating an electrical configuration of the same person determination device.

An overall operation of the same person determination device 1 is controlled by a central processing unit (CPU) 6.

In the same person determination device 1, a communication device 2 for communicating with another device over a network such as the Internet, a memory 3 that temporarily stores data or the like, a display device 4, and a display control device 5 that controls the display device 4 are included. Further, in the same person determination device 1, an input device 7 such as a keyboard for applying a command or the like to the same person determination device 1 is provided. An output signal from the input device 7 is applied to the CPU 6.

Further, a hard disk 9 that stores data such as image data, a hard disk drive 8 for accessing the hard disk 9, and a compact disc drive 10 for accessing a compact disc 11 are included in the same person determination device 1.

A program for controlling an operation to be described below is stored in the compact disc 11. This program is read from the compact disc 11 by the compact disc drive 10. By the read program being installed in the same person determination device 1, the operation to be described below is performed. The program may be downloaded from a network using the communication device 2, instead of being stored in a recording medium such as the compact disc 11.

Figure 2:
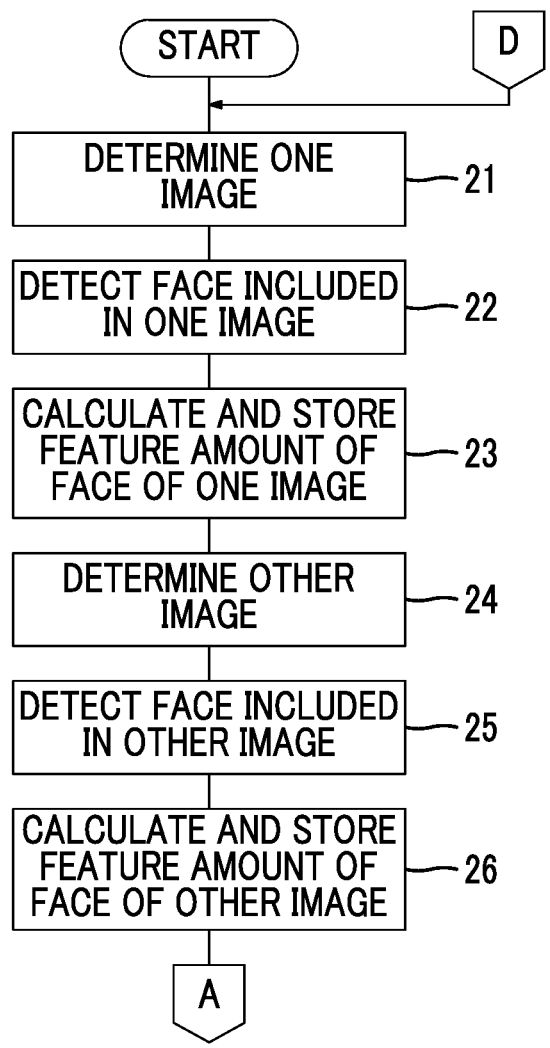
FIG. 2 is a flowchart illustrating a processing procedure of the same person determination device.
Figure 3:
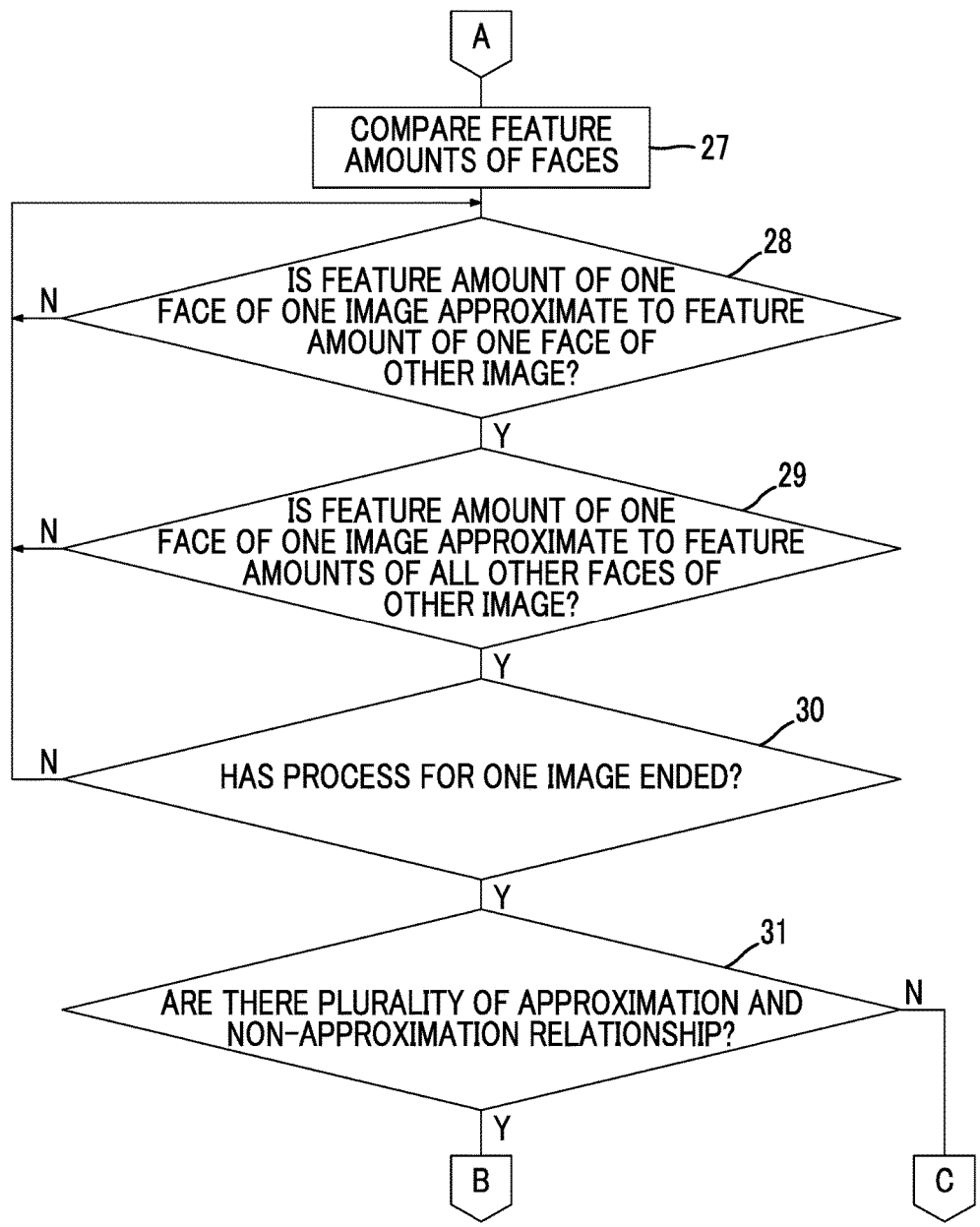
FIG. 3 is a flowchart illustrating the processing procedure of the same person determination device.
Figure 4:
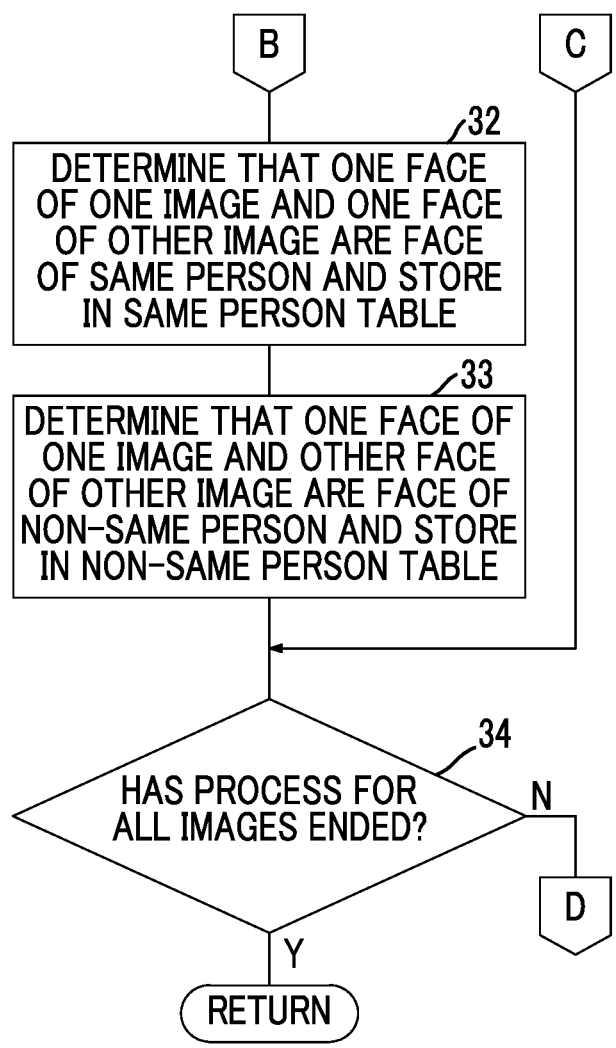
FIG. 4 is a flowchart illustrating the processing procedure of the same person determination device.

FIGS. 2 to 4 are flowcharts illustrating a processing procedure of the same person determination device 1, and FIGS. 5 to 8 illustrate examples of an image in which a plurality of faces are included. Image data representing the images has been stored in the hard disk 9. The image data may be downloaded via the communication device 2 instead of the image data being stored in the hard disk 9, or image data recorded on a recording medium such as a memory card may be loaded into the same person determination device 1.

Figure 5:
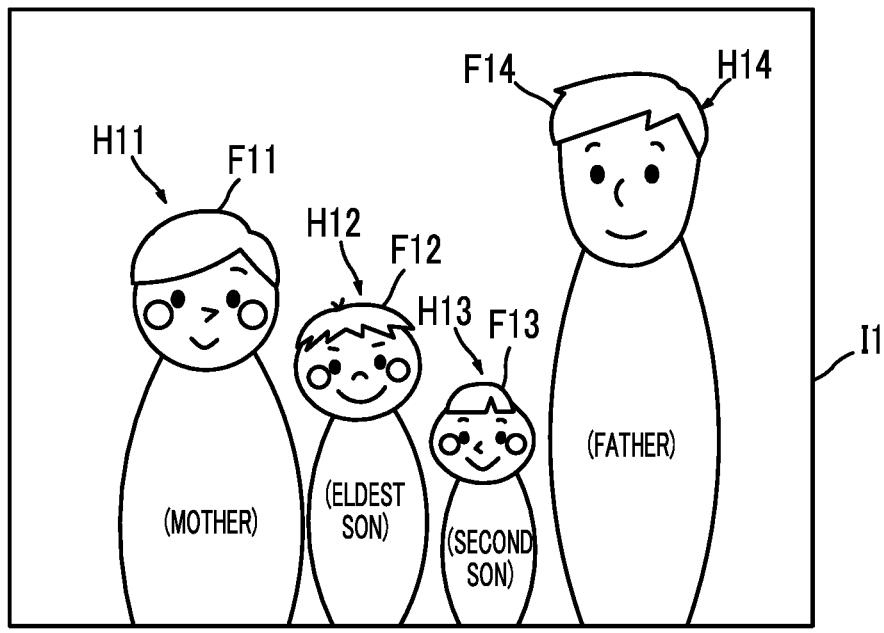
FIG. 5 is an example of an image.
Figure 6:
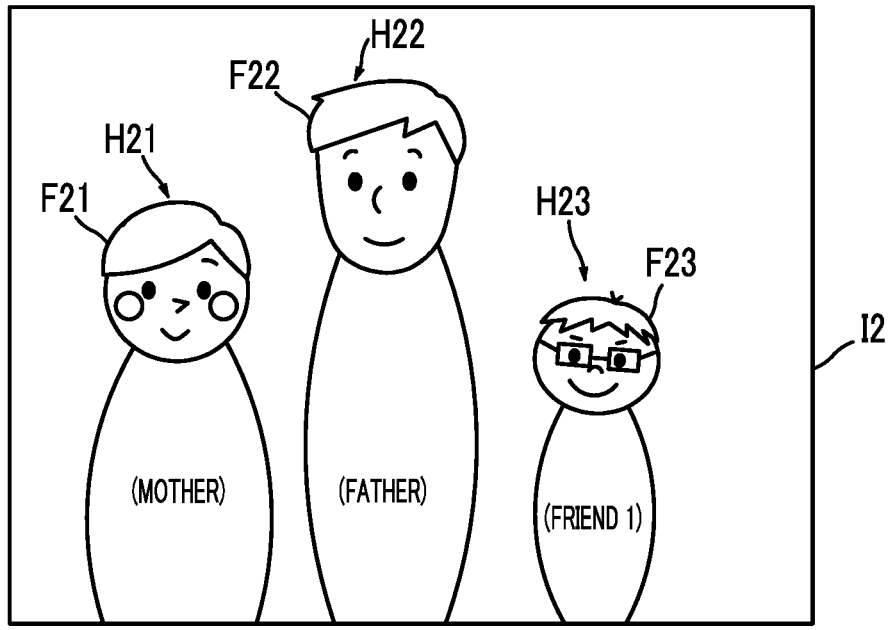
FIG. 6 is an example of an image.
Figure 7:
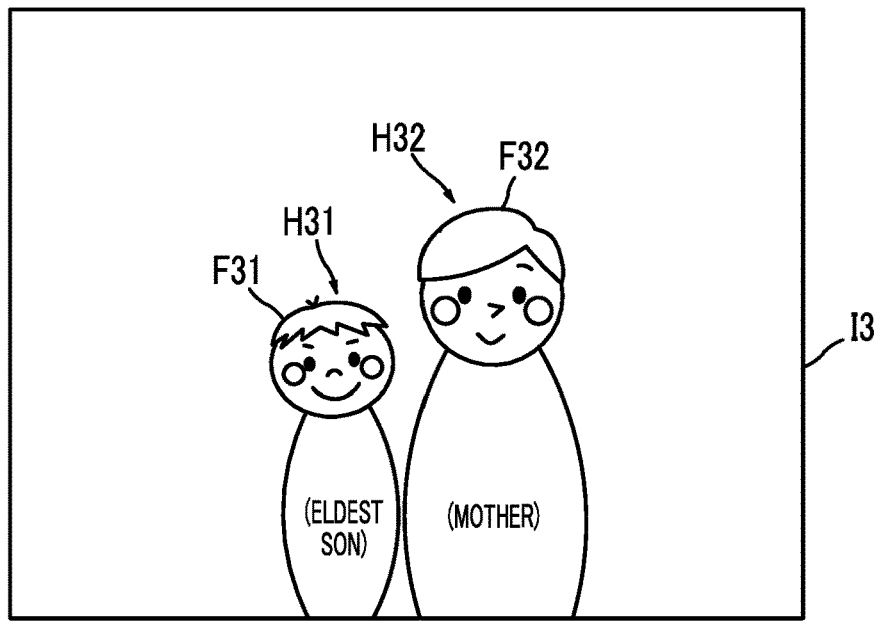
FIG. 7 is an example of an image.
Figure 8:
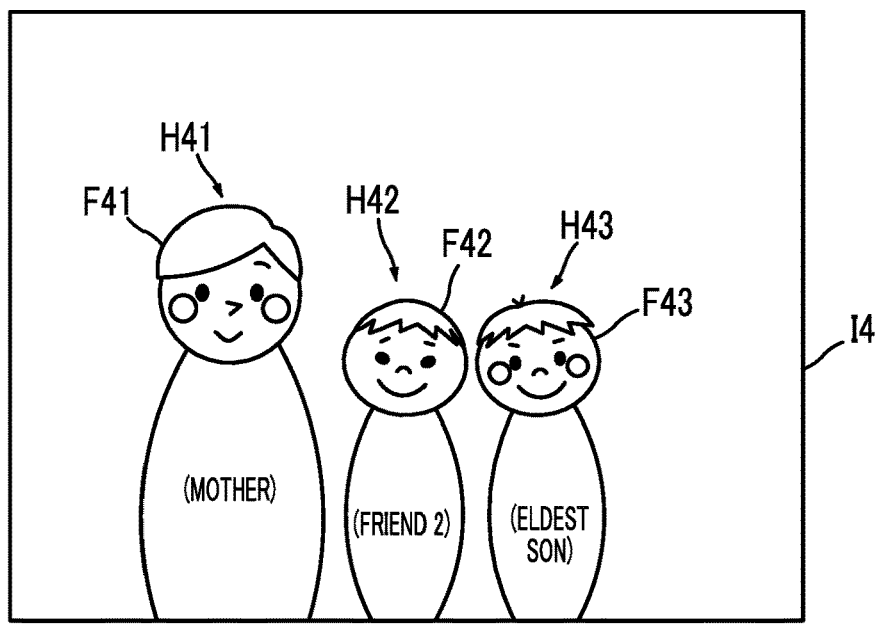
FIG. 8 is an example of an image.

FIG. 5 illustrates a first image I1, and person images H11 to H14 are included. The first image I1 is an image obtained by imaging a family, and the person images H11, H12, H13 and H14 are an image of a mother, an image of an eldest son, an image of a second son, and an image of a father, respectively. FIG. 6 illustrates a second image I2, and person images H21 to H23 are included. The second image I2 is an image obtained by imaging a married couple including a mother and a father, and a friend thereof, and the person images H21, H22 and H23 are an image of the mother, an image of the father, and an image of the friend, respectively. FIG. 7 illustrates a third image I3, and person images H31 and H32 are included. The third image I3 is an image obtained by imaging a parent and a child, and the person images H31 and H32 are an image of an eldest son and an image of the mother. FIG. 8 illustrates a fourth image I4, and person images H41 to H43 are included. The fourth image I4 is an image obtained by imaging a parent, a child, and a friend, and person images H41, H42 and H43 are an image of the mother, an image of the friend, and an image of an eldest son. In FIGS. 5 to 8, a word such as "mother", "eldest son", "second son", "father", or "friend" is attached to each person image so that the person image can be identified, but the same person determination device 1 does not recognize which person image indicates a mother, an eldest son, a second son, a father, or a friend (a feature of each person may be registered in the same person determination device 1 in advance and a person indicated by each person image may be recognized).

In This embodiment, a face of the same person is determined from a plurality of images in which a plurality of faces are included. In this embodiment, the face of the same person is determined from four images I1 to I4, but the present invention is not limited to the four images if there are a plurality of images in which a plurality of faces are included.

One of the plurality of images I1 to I4 is determined by the CPU 6 (step 21 in FIG. 2). The image may be determined by a user of the same person determination device 1. The first image I1 is assumed to have been determined as the one image. Subsequently, a face detection process is performed on the one determined image I1 by the CPU 6, and a face is detected from the one image I1 (Step 22 in FIG. 2).

Figure 9:
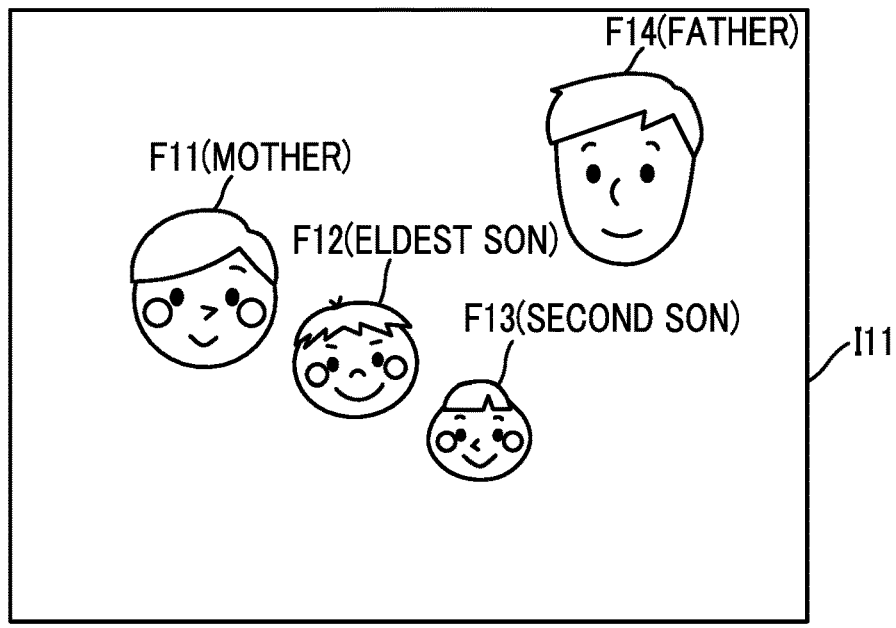
FIG. 9 illustrates faces detected from an image.

FIG. 9 illustrates a state in which faces F11 to F14 are detected from the one image I1. The face F11 is a face detected from the person image H11, and is a face F11 of the "mother". The face F12 is a face detected from the person image H12, and is a face F12 of the "eldest son". The face F13 is a face detected from the person image H13, and is a face F13 of the "second son". The face F14 is a face detected from the person image H14, and is a face F14 of the "father". In FIG. 9, a word "mother", "eldest son", "second son", or "father" is attached so that whose face is that can be seen, but the same person determination device 1 does not recognize whose face is a detected face, as described above.

Subsequently, a feature amount of each of a plurality of faces F11, F12, F13, and F14 detected from the one image I1 is calculated by the CPU 6 (a first feature amount calculation device), and the calculated feature amount of the face is stored in the feature amount table (a feature amount storage device) (step 23 in FIG. 2). A feature amount table is stored in the memory 3 (a feature amount storage device). The feature amount of the face is a numerical value of a position or a size of an eye, a nose, a mouth, or an ear with respect to the entire face, and is obtained using a known scheme.

FIG. 13 illustrates an example of the feature amount table.

The feature amount table stores the calculated feature amount of the face, for each face detected from the image. The feature amount table is stored in the memory 3. The feature amounts of the respective faces F11, F12, F13, and F14 detected from the one image I1 are L11, L12, L13, and L14.

Returning to FIG. 2, another image is determined by the CPU 6 (step 24). Alternatively, another image may be determined by a user operating the same person determination device 1. Here, a second image 16 is assumed to have been determined as another image by the CPU 6. Subsequently, the face detection process is performed by the CPU 6 and faces are detected from the second image I2 determined as another image, as in the one image I1 (step 25 in FIG. 2).

Figure 10:
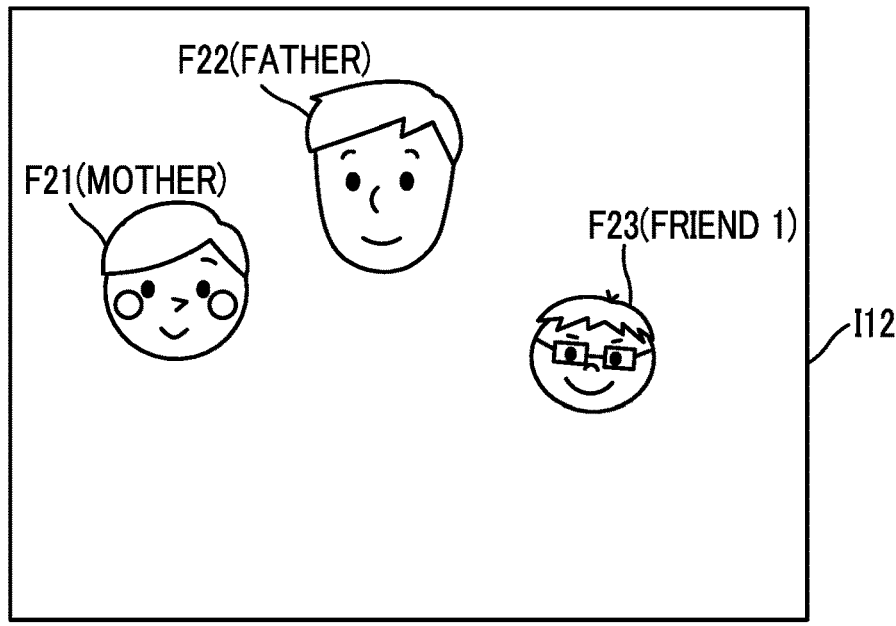
FIG. 10 illustrates faces detected from an image.

FIG. 10 illustrates a state in which faces F21 to F23 are detected from the other image 12. The face F21 is a face detected from the person image H21, and is a face F21 of the "mother". The face F22 is a face detected from the person image H22, and is a face of the "father". The face F23 is a face detected from the person image H23, and is a face of the "friend". In FIG. 10, a word "mother", "father", and "friend" is attached so that whose face is that can be seen.

Returning to FIG. 2, the feature amount of each of the plurality of faces F21, F22, and F23 detected from the other image I2 is calculated by the CPU 6 (a second feature amount calculation device), and the calculated feature amount of the face is stored in the feature amount table, similar to the above description (step 26). Accordingly, L21, L22 and L23 are stored as the feature amounts of the respective faces F21, F22, and F23 detected from the other image I2 in the feature amount table in FIG. 13.

Subsequently, the feature amounts L11, L12, L13 and L14 of the respective faces calculated from the one image I1 are compared with the feature amounts L21, L22 and L23 of the respective faces calculated from the other image I2 different from the one image by the CPU 6 [a feature amount comparison device; the feature amount of each face calculated from one image by the first feature amount calculation device is compared with the feature amount of each face calculated from the other image by the second feature amount calculation device (feature amount of each face stored in the feature amount storage device)] (step 27 in FIG. 3). It is determined whether a plurality of relationships in which the feature amount of the one face calculated from the one image I1 approximates to the feature amount of the one face obtained from the other image I2, and the feature amount of the one face calculated from the one image I1 does not approximate to the feature amount of all other faces other than the one face obtained from the other image I2 (approximation and non-approximation relationships) are obtained from the one image I1 and the other image I2 by the comparison. If a plurality of such relationships are obtained, the one face included in the one image I1 and the one face included in the other image I2 are determined to be a face of the same person.

First, it is determined whether the feature amount of one face calculated from the one image I1 approximates to the feature amount of one the face calculated from the other image I2 (step 28 in FIG. 3). For example, the face F11 is determined as one face from among the faces F11 to F14 included in the one image I1 by the CPU 6, and the face F21 is determined as one face from among the faces F21 to F23 included in the other image I2 by the CPU 6. It is determined whether the feature amount L11 of the one face F11 included in the one image I1 approximates to the feature amount L21 of one the face F21 included in the other image I2. If a difference between the feature amount L11 and the feature amount L21 is smaller than (equal to or smaller than) a threshold value, the feature amount L11 is determined to approximate to the feature amount L21. If the difference between the feature amount L11 and the feature amount L21 is equal to or greater than (greater than) the threshold value, the feature amount L11 is determined not to approximate to the feature amount L21. Feature amounts of a plurality of faces of the same person are calculated, and the threshold value can be determined from the amount of a change in the obtained feature amount.

Further, it is determined whether the feature amount of the one face included in the one image I1 approximates to feature amounts of all other faces of the other image I2 (step 29 in FIG. 3). For example, it is determined whether the feature amount L11 of the one face F11 of the one image I1 does not approximate to the feature amount L22 of the face F22 of the other image I2, and the feature amount L11 of the one face F11 of the one image I1 does not approximate to the feature amount L23 of the face F23 of the other image I2. If a difference between the feature amount L11 and the feature amount L22 is equal to or greater than (greater than) the threshold value, the feature amount L11 is determined not to approximate to the feature amount L22, and otherwise, the feature amount L11 is determined to approximate to the feature amount L22. For a plurality of faces that are not of the same person, but approximate to each other, like faces of a parent and a child, a brother, or a relative, feature amounts thereof are calculated, and the threshold value can be determined from a difference between the obtained feature amounts.

For all the faces F11, F12, F13, and F14 included in the one image I1, the one face F11 is changed to F12, F13, and F14 and the processes of steps 28 and 29 are performed (step 30 in FIG. 3). Further, for all the faces F21, F22, and F23 included in the other image I2, the one face F21 is changed to F22 and F23 and the processes of steps 28 and 29 are performed (step 30 in FIG. 3). The processes of steps 28 and 29 are performed on all combinations of the faces F11 to F14 included in the one image I1 and the face F21 to F23 included in the other image I2.

It is determined whether there are a plurality of relationships (approximation and non-approximation relationships) between a determination result of approximation in step 28 and a determination result of non-approximation in step 29 (step 31 in FIG. 3).

If it is determined that there are a plurality of approximation and non-approximation relationships (YES in step 31 of FIG. 3), one face of one image determined as above and one face of the other image are determined to be a face of the same person by the CPU 6 (a person determination device) (step 32 in FIG. 4). A result of the determination is stored in the same person table (step 32 in FIG. 4).

FIG. 14 illustrates an example of the same person table.

For each person, identification data of the person image determined to that person is stored in the same person table. In FIG. 14, signs of person images are stored for each group for the sake of clarity. For example, groups 1, 2, 3 and 4 are groups of a mother, an eldest son, a second son, and a father, respectively. Signs of person images corresponding to the respective groups are stored. Each face determined to be of the same person is grouped by the CPU 6. Such a same person table is generated by the CPU 6 (a grouping device) and stored in the memory 3.

Referring back to FIG. 4, if one face of one image and one face of the other image are determined to be the face of the same person, the one face of the one image and all other faces other than the one face of the other image are considered not to be a face of the same person. Accordingly, it is determined by the CPU 6 that the one face of the one image and all the other faces of the other image are faces of the non-same persons (a person determination device) (step 33 in FIG. 4). Such a determination result is stored in the non-same person table (step 33 in FIG. 4).

FIG. 15 is an example of a non-same person table.

For each person, identification data of a person image determined to be of a person different from that person is stored in the non-same person table. In FIG. 15, signs of person images are stored for each group for the sake of clarity. For example, a person of a person image H11 is a person different from those of person images H22, H23, H42, and H43. The same applies to persons of other person images. The non-same person table is also generated by the CPU 6 and stored in the memory 3.

For example, it is assumed that a relationship in which the feature amount L11 of the one face F11 of the one image I1 approximates to the feature amount L21 of the one face F21 of the other image I2, and the feature amount L11 of the one face F11 of the one image I1 does not approximate to the feature amounts L22 and L23 of all the other faces F22 and F23 of the other image I2 has been established, and a relationship in which the feature amount L14 of the one face F14 of the one image I1 approximates to the feature amount L22 of the one face F22 of the other image I2, and the feature amount L14 of the one face F14 of the one image I1 does not approximate to the feature amounts L21 and L23 of all the other faces F21 and F23 of the other image I2 has been established, as described above. Then, since there are a plurality of approximation and non-approximation relationships described above, the one face F11 of the one image I1 and the one face F21 of the other image I2 are determined to be a face of the same person, and the one face F14 of the one image I1 and the one face F23 of the other image I2 are determined to be a face of the same person. Each person determined to have the face of the same person as described above is grouped in the same person table, as illustrated in FIG. 14. Further, the one face F11 of the one image I1 and all the other faces F22 and F23 other than the one face F21 of the other image I2 are determined to be faces of different persons, and the one face F14 of the one image I1 and all the other faces F21 and F23 other than the one face F23 of the other image I2 are determined to be faces of different persons. Data for identifying the persons determined to have the faces of the non-same persons as described above are stored in the non-same person table, as illustrated in FIG. 15.

Referring back to FIG. 3, in a case where there are no plurality of approximation and non-approximation relationships described above (NO in step 31), it is not determined by the CPU 6 that one face included in one image and one face included in the other image are of the same person even when only one approximation and non-approximation relationship is obtained and a feature amount of the one face included in the one image approximates to a feature amount of the one face included in the other image. Accordingly, the processes of steps 32 and 33 in FIG. 4 are skipped.

Figure 11:
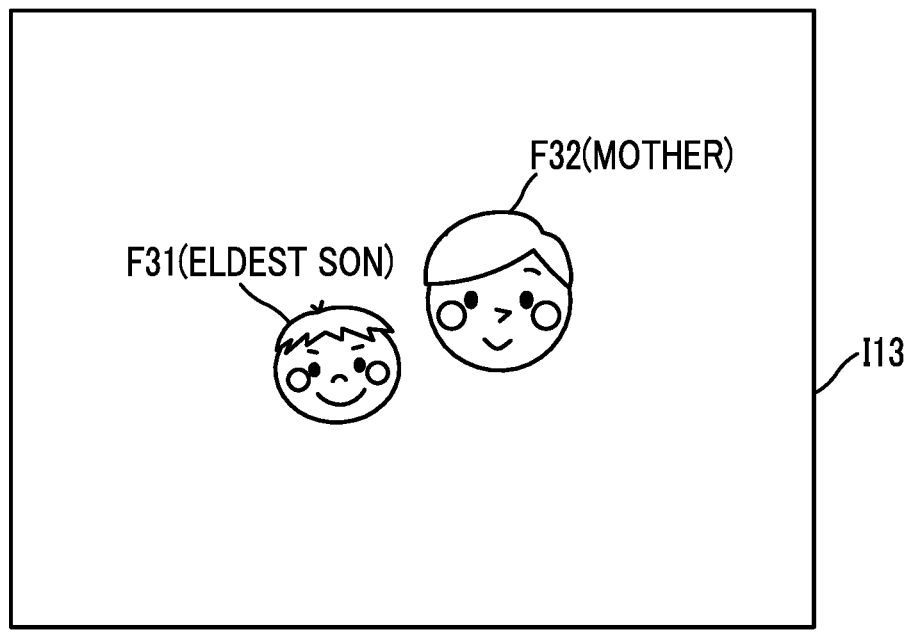
FIG. 11 illustrates faces detected from an image.

If the above-described process for all the images has not ended (NO in step 34 of FIG. 4), a process from step 21 of FIG. 2 is repeated. If the above-described process in a case where one image is the image I1 and the other image is the image I2 ends, the one image is the image I1 again, the other image is the image I3 illustrated in FIG. 7, and the above-described process is performed. From the person images H31 and H32 included in the other image I3 illustrated in FIG. 7, face images F31 and F32 are detected as illustrated in FIG. 11, and feature amounts L31 and L32 of the faces are calculated. The calculated feature amounts L31 and L32 of the faces are stored in the feature amount table illustrated in FIG. 13, and a process of detecting the same person and the non-same person is performed, as described above.

An approximation and non-approximation relationship in which the feature amount L11 of the one face F11 of the person image H11 included in the one image I1 illustrated in FIG. 5 approximates to the feature amount L32 of the one face F32 of the person image H32 included in the other image I3 illustrated in FIG. 7, and the feature amount L11 does not approximate to the feature amount L31 of all other faces F31 included in the other image I3 is established between the one image I1 illustrated in FIG. 5 and the other image I3 illustrated in FIG. 7, but since there is only such an approximation and non-approximation relationship, it is not determined that the one face F11 of the one image I1 and the face F32 at a position of the other image I3 are the same person.

Figure 12:
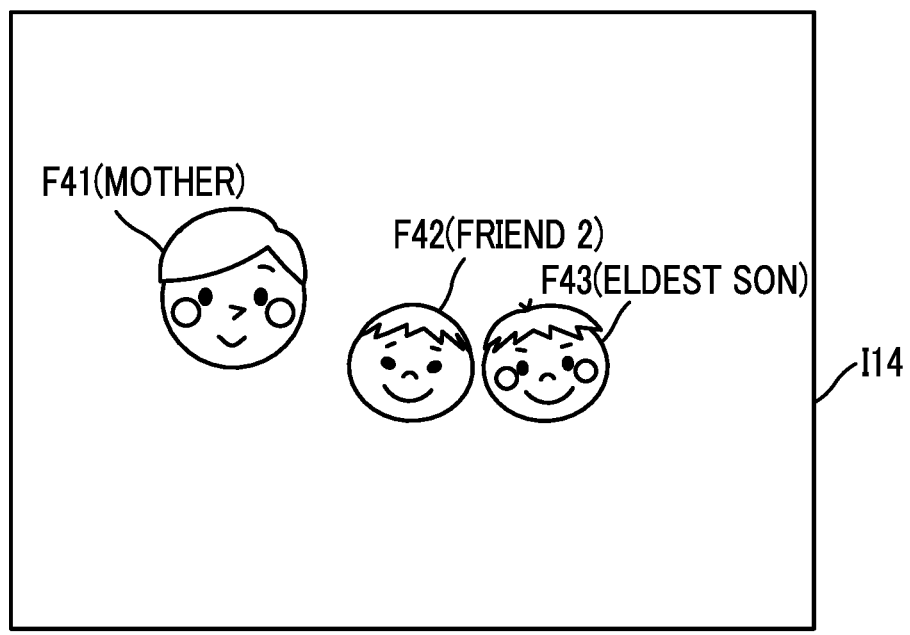
FIG. 12 illustrates faces detected from an image.

Further, between the one image I1 illustrated in FIG. 5 and the other image I4 illustrated in FIG. 8, faces F41, F42, and F43 are detected from the other image I4 illustrated in FIG. 8, as illustrated in FIG. 12, and the feature amounts L41, L42, and L43 of the respective faces are calculated, as described above. The calculated feature amounts L41, L42, and L43 are stored in the feature amount table illustrated in FIG. 13.

An approximation and non-approximation relationship in which the feature amount L11 of the one face F11 of the person image H11 included in the one image I1 illustrated in FIG. 5 approximates to the feature amount L41 of the one face F41 of the person image H41 included in the other image I4 illustrated in FIG. 8, and the feature amount L11 does not approximate to the feature amounts L42 and L43 of all other faces F42 and F43 included in the other image I4 is established between the one image I1 illustrated in FIG. 5 and the other image I4 illustrated in FIG. 8, and an approximation and non-approximation relationship in which the feature amount L12 of the one face F12 of the person image H12 included in the one image I1 illustrated in FIG. 5 does not approximate to the feature amounts L41 and L42 of all the other faces F41 and F42 included in the other image I4 in FIG. 8 is also established. Since there are a plurality of approximation and non-approximation relationships, it is determined that the person image H11 included in the one image I1 in FIG. 5 and the person image H41 included in the other image I4 in FIG. 8 are the same person, and the person image H12 included in the one image I1 in FIG. 5 and the person image H43 included in the other image I4 in FIG. 8 are the same person. Further, it is determined that the person image H11 included in the one image I1 in FIG. 5 and the person images H42 and H43 included in the other image I4 in FIG. 8 are the non-same person, and the person image H12 included in the one image I1 in FIG. 5 and the person images H41 and H42 included in the other image I4 in FIG. 8 are the non-same person.

If the above-described process in which the image I1 illustrated in FIG. 5 is the one image and the respective images I2 to I4 illustrated in FIGS. 6 to 8 are the other images ends, then the above-described process in which the image I2 illustrated in FIG. 6 is the one image and the images I3 and I4 illustrated in FIGS. 7 and 8 are the other images is performed. Further, the above-described process in which the image I3 illustrated in FIG. 7 is the one image and the image I4 illustrated in FIG. 8 is the other image is performed. Thus, control is performed by the CPU 6 so that the feature amount comparison process and the person determination process described above are performed on the plurality of other images (a control device).

Captured images of a family, a parent and a child, a brother, a sister, a relative, or the like resemble one another. Therefore, in a case where it is determined whether persons are the same persons on the basis of a degree of similarity (feature amount) of the face, it is necessary to increase a threshold value for determining whether persons are the same persons in order to increase accuracy. According to this embodiment, in a case where there are a plurality of approximation and non-approximation relationships as described above, the persons are determined to be the same persons, it is not necessary to increase the threshold value. Even when a degree of similarity of the face is not very high, it is possible to find the same person. For example, even when a front face of a child does not face a camera, it is possible to determine whether persons are the same persons.

Further, each face determined to be of the same person from the same person table generated as described above may be displayed as a list on a display screen of the display device 4. Further, an album can be generated using a plurality of images in which a person having most images of a face determined to be of the same person is necessarily included.

What is claimed is:
1. A same person determination device, comprising:
a processor configured to:
calculate, as a first feature amount calculation device, a feature amount of each of a plurality of faces from one image in which the plurality of faces are included;
compare, as a feature amount comparison device, the feature amount of each face calculated from the one image by the first feature amount calculation device with a feature amount of each of a plurality of faces included in another image different from the one image;
determine, as a person determination device, a first relationship in which a feature amount of one face calculated from the one image approximates to a feature amount of one face obtained from the other image;
determine, as the person determination device, a second relationship in which the feature amount of the one face calculated from the one image does not approximate to feature amounts of all other faces other than the one face obtained from the other image; and determine, as the person determination device, that the one face included in the one image and the one face included in the other image are a face of the same person based on the first relationship and the second relationship, the first and second relationships being obtained from the one image and the other image through the comparison in the feature amount comparison device.

2. The same person determination device according to claim 1, wherein the person determination device determines that the one face included in the one image and the one face included in the other image are a face of the same person and determines that the one face included in the one image and all other faces included in the other image are of a non-same person, when the first and second relationships are obtained from the one image and the other image.

3. The same person determination device according to claim 1, wherein in a case where only one of the relationships is obtained from the one image and the other image, the person determination device does not determine that the one face included in the one image and the one face included in the other image are a face of the same person.

4. The same person determination device according to claim 1, wherein the processor is further configured to:

calculate, as a second feature amount calculation device, a feature amount of each of the plurality of faces from the other image, wherein the feature amount comparison device compares the feature amount of each face calculated from the one image by the first feature amount calculation device with the feature amount of each face calculated from the other image by the second feature amount calculation device.

5. The same person determination device according to claim 1, further comprising:

a feature amount storage device for storing the feature amount of each of the plurality of faces included in the other image, wherein the feature amount comparison device compares the feature amount of each face calculated from the one image by the first feature amount calculation device with the feature amount of each face stored in the feature amount storage device.

6. The same person determination device according to claim 1, wherein there are a plurality of other images, and the processor is further configured to:

perform, as a control device, a process in the feature amount comparison device and a process in the person determination device on the plurality of other images.

7. The same person determination device according to claim 1, wherein the processor is further configured to:

group, as a grouping device, respective faces determined to be faces of the same person by the person determination device.

8. A same person determination method, comprising:

calculating, by a feature amount calculation device, a feature amount of each of a plurality of faces from one image in which the plurality of faces are included;

comparing, by a feature amount comparison device, the feature amount of each face calculated from the one image by the first feature amount calculation device with a feature amount of each of a plurality of faces included in another image different from the one image;

determining, by a person determination device, a first relationship in which a feature amount of one face calculated from the one image approximates to a feature amount of one face obtained from the other image;

determining, by the person determination device, a second relationship in which the feature amount of the one face calculated from the one image does not approximate to feature amounts of all other faces other than the one face obtained from the other image; and determining, by the person determination device, that the one face included in the one image and the one face included in the other image are a face of the same person based on the first relationship and the second relationship, the first and second relationships being obtained from the one image and the other image through the comparison in the feature amount comparison device.

9. A non-transitory recording medium storing a computer-readable program for controlling a computer of a same person determination device, the program controlling the computer of the same person determination device so that:

a feature amount of each of a plurality of faces is calculated from one image in which the plurality of faces are included;

the feature amount of each face calculated from the one image is compared with a feature amount of each of a plurality of faces included in another image different from the one image;

a first relationship in which a feature amount of one face calculated from the one image approximates to a feature amount of one face obtained from the other image is determined;

a second relationship in which the feature amount of the one face calculated from the one image does not approximate to feature amounts of all other faces other than the one face obtained from the other image is determined; and it is determined that the one face included in the one image and the one face included in the other image are a face of the same person based on the first relationship and the second relationship, the first and second relationships being obtained from the one image and the other image through the comparison.

* * * * *